US012674887B2

(12) United States Patent
Moskovchenko et al.

(10) Patent No.: US 12,674,887 B2
(45) Date of Patent: Jul. 7, 2026

(54) TARGET VALUE DETECTION FOR UNMANNED AERIAL VEHICLES

(71) Applicant: Skydio, Inc., San Mateo, CA (US)

(72) Inventors: Stepan Moskovchenko, Belmont, CA (US); Joseph Anthony Enke, Campbell, CA (US)

(73) Assignee: Skydio, Inc., San Mateo, CA (US)

( * ) Notice: Subject to any disclaimer, the term of this patent is extended or adjusted under 35 U.S.C. 154(b) by 156 days.

(21) Appl. No.: 18/600,029

(22) Filed: Mar. 8, 2024

(65) Prior Publication Data

US 2025/0067869 A1     Feb. 27, 2025

Related U.S. Application Data

(60) Division of application No. 16/784,409, filed on Feb. 7, 2020, now Pat. No. 11,933,891, which is a continuation of application No. 15/639,454, filed on Jun. 30, 2017, now Pat. No. 10,557,936.

(51) Int. Cl.
| | |
|---|---|
| *G01S 15/42* | (2006.01) |
| *B64D 47/00* | (2006.01) |
| *B64U 10/14* | (2023.01) |
| *B64U 20/87* | (2023.01) |
| *B64U 50/19* | (2023.01) |
| *B64U 50/30* | (2023.01) |

(Continued)

(52) U.S. Cl.
CPC .............. *G01S 15/42* (2013.01); *B64D 47/00* (2013.01); *G01S 15/04* (2013.01); *B64U 10/14* (2023.01); *B64U 20/87* (2023.01); *B64U 50/19* (2023.01); *B64U 50/30* (2023.01); *B64U*

*2101/30* (2023.01); *B64U 2201/10* (2023.01); *B64U 2201/20* (2023.01)

(58) Field of Classification Search
None
See application file for complete search history.

(56) References Cited

U.S. PATENT DOCUMENTS

| | | |
|---|---|---|
| 2,134,126 A | 10/1938 | Hooven |
| 2,173,137 A | 9/1939 | Sharma |
| 2,423,072 A | 6/1947 | Willoughby |

(Continued)

FOREIGN PATENT DOCUMENTS

| | | |
|---|---|---|
| WO | 9303399 A1 | 2/1993 |
| WO | 2005081074 A1 | 9/2005 |

OTHER PUBLICATIONS

Chen, Junjie, et al. Identification of autonomous landing sign for unmanned aerial vehicle based on faster regions with convolutional neural network. 2017 Chinese Automation Congress (CAC). IEEE, 2017. (Year: 2017) 6 pages.

(Continued)

*Primary Examiner* — Jonathan D Armstrong
(74) *Attorney, Agent, or Firm* — Young Basile Hanlon & MacFarlane, P.C.

(57) ABSTRACT

A method, including receiving a first set of ultrasonic responses to first ultrasonic signals transmitted using one or more transducers; generating a confidence value based on a detection of a target value using the first set of ultrasonic responses; receiving a second set of ultrasonic responses to second ultrasonic signals transmitted using the one or more transducers; and updating the confidence value using the second set of ultrasonic responses.

20 Claims, 7 Drawing Sheets

(51) Int. Cl.
   B64U 101/30 (2023.01)
   G01S 15/04 (2006.01)

(56) References Cited

U.S. PATENT DOCUMENTS

| | | | |
|---|---|---|---|
| 2,475,256 A | 7/1949 | Saint | |
| 4,244,026 A | 1/1981 | Dickey, Jr. | |
| 4,686,532 A | 8/1987 | McAulay | |
| 4,718,023 A | 1/1988 | Arora | |
| 4,752,799 A | 6/1988 | Stauffer | |
| 4,821,206 A | 4/1989 | Arora | |
| 5,184,330 A | 2/1993 | Adams | |
| 5,579,285 A | 11/1996 | Hubert | |
| 5,907,521 A | 5/1999 | Matsui | |
| 7,133,746 B2 | 11/2006 | Abramson | |
| 7,355,513 B1 | 4/2008 | Brockel | |
| 8,047,149 B1* | 11/2011 | Antonelli | B63G 8/001 |
| | | | 114/230.1 |
| 8,103,019 B1* | 1/2012 | Pandey | H04R 3/02 |
| | | | 381/94.1 |
| 8,660,736 B2 | 2/2014 | Chen | |
| 9,820,433 B2 | 11/2017 | Borinato | |
| 10,029,804 B1* | 7/2018 | Chamberlain | G08G 5/74 |
| 10,110,751 B2 | 10/2018 | Ofir | |
| 10,397,495 B1 | 8/2019 | Graber | |
| 10,402,646 B2 | 9/2019 | Klaus | |
| 10,557,936 B2 | 2/2020 | Moskovchenko | |
| 11,933,891 B2 | 3/2024 | Moskovchenko | |
| 2003/0039171 A1 | 2/2003 | Chiapetta | |
| 2003/0220554 A1 | 11/2003 | Grenon | |
| 2005/0156562 A1 | 7/2005 | Cohen | |
| 2006/0266881 A1 | 11/2006 | Hughey | |
| 2010/0017114 A1 | 1/2010 | Tehan | |
| 2012/0327239 A1 | 12/2012 | Inoue | |
| 2013/0162461 A1 | 6/2013 | Lucking | |
| 2013/0286783 A1 | 10/2013 | Sussman | |
| 2013/0325217 A1* | 12/2013 | Seydoux | G05D 1/042 |
| | | | 701/4 |
| 2015/0049578 A1 | 2/2015 | Hoctor | |
| 2015/0268337 A1 | 9/2015 | Moe | |
| 2016/0068264 A1 | 3/2016 | Ganesh | |
| 2017/0001311 A1 | 1/2017 | Bushman | |
| 2017/0006263 A1 | 1/2017 | Sron | |
| 2017/0045894 A1 | 2/2017 | Canoy | |
| 2017/0083024 A1 | 3/2017 | Reijersen Van Buuren | |
| 2017/0129603 A1* | 5/2017 | Raptopoulos | B64F 1/22 |
| 2017/0197729 A1 | 7/2017 | Derenick | |
| 2018/0029723 A1 | 2/2018 | Krauss | |
| 2018/0131449 A1 | 5/2018 | Kare | |
| 2018/0265196 A1 | 9/2018 | Phillips | |
| 2019/0004173 A1 | 1/2019 | Moskovchenko | |
| 2019/0039750 A1 | 2/2019 | Peng | |
| 2019/0056498 A1 | 2/2019 | Sonn | |
| 2019/0079509 A1 | 3/2019 | Bosworth | |
| 2019/0187724 A1 | 6/2019 | Li | |
| 2020/0110509 A1* | 4/2020 | Drumm | G06F 3/0421 |
| 2020/0174117 A1 | 6/2020 | Moskovchenko | |
| 2020/0265726 A1 | 8/2020 | Dupray | |

OTHER PUBLICATIONS

Murshid, Syed H., Rayan Enaya, and Gregory L. Lovell. Concentric circles based simple optical landing aid for vertical takeoff and landing aircrafts. Photonics Applications for Aviation, Aerospace, Commercial, and Harsh Environments V. vol. 9202. SPIE, 2014. (Year: 2014) 9 pages.

Yata, Teruko, Akihisa Ohya, and Shinichi Yuta. "A fast and accurate Sonar-ring Sensor fora Mobile Robot." Proceedings 1999 IEEE International Conference on Robotics and Automation (Cat. No. 99CH36288C). vol. 1. IEEE, 1999. (Year: 1999) (7 pages).

* cited by examiner

TARGET VALUE DETECTION FOR UNMANNED AERIAL VEHICLES

CROSS REFERENCE TO RELATED APPLICATIONS

This application is a divisional of U.S. patent application Ser. No. 16/784,409, filed Feb. 7, 2020, which is a continuation of U.S. patent application Ser. No. 15/639,454, filed on Jun. 30, 2017, now U.S. Pat. No. 10,557,936, the contents of which are incorporated by reference herein in their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates to target value detection for confidence value generation.

BACKGROUND

Unmanned aerial vehicles (UAVs) may be used for commercial and recreational purposes. A UAV may include ultrasonic functionality for detecting objects, such as to determine a position of the UAV relative to the object, a distance between the UAV and the object, or the like. Information about detected objects can be useful for other aspects of the UAV. For example, in the context of vision-based navigation, information about the distance between the UAV and a detected object can be used to supplement successive images indicating visual distinctions between observed objects. In another example, in the context of video processing, information about the position of the UAV relative to an object can be successively used to indicate motion. The ultrasonic functionality of a UAV relies upon a transducer transmitting ultrasonic signals using appropriate gain, power, and other values.

SUMMARY

Systems and techniques for target value detection for confidence value generation are described below.

One aspect of the disclosure is a non-transitory computer-readable storage medium, comprising processor-executable routines that, when executed by a processor, facilitate a performance of operations. The operations comprise determining a position of a target value reflected from an object relative to a first range area defined for a vehicle and a second range area defined for the vehicle, and generating a confidence value for a position of the object relative to the vehicle based on the position of the target value relative to the first range area and the second range area. The confidence value is a first confidence value when the position of the target value is determined to be within the first range area and within the second range area. The confidence value is a second confidence value lower than the first confidence value when the position of the target value is determined to be outside of the first range area and within the second range area.

Another aspect of the disclosure is a system comprising a first transducer, a second transducer, and a signal processor. The first transducer receives a first ultrasonic response to a first ultrasonic signal using a first beam pattern. The second transducer receives a second ultrasonic response to a second ultrasonic signal using a second beam pattern. The signal processor generates a confidence value based on a position of a target value relative to a first range area associated with the first beam pattern and a second range area associated with the second beam pattern. The target value is included in one of the first ultrasonic response or the second ultrasonic response.

Another aspect of the disclosure is a method comprising receiving a first set of ultrasonic responses to first ultrasonic signals transmitted using one or more transducers, generating a confidence value based on a detection of a target value using the first set of ultrasonic responses, receiving a second set of ultrasonic responses to second ultrasonic signals transmitted using the one or more transducers, and updating the confidence value using the second set of ultrasonic responses.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed implementations have other advantages and features that will be more readily apparent from the detailed description, the appended claims, and the accompanying figures. A brief introduction of the figures is below.

DETAILED DESCRIPTION

Figure 1A:
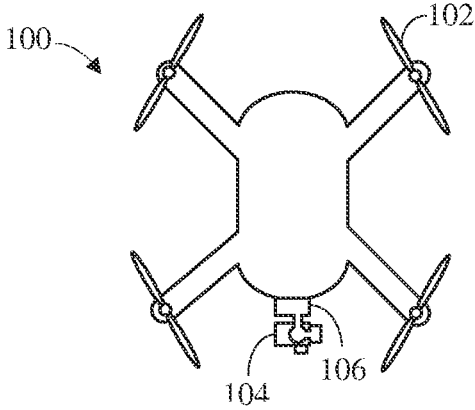
FIG. 1A shows an example of a UAV.

A UAV may use a sensor, such as a transducer, to send and receive ultrasonic waves used to determine information such as a position of the UAV with respect to an object below it, a distance between the UAV and the object, or the like. A transducer of a UAV is typically configured with a cone, which creates a spatial range area for the transducer to transmit or receive ultrasonic waves. Specifically, the cone of the transducer has a beam pattern that defines the range area, or area below the UAV within which the transducer of the UAV may detect reflections of ultrasonic waves, or target values. For example, the range area is larger where the beam pattern is large, such as because the transducer has a larger sensitivity for processing ultrasonic waves when a larger beam pattern is used. However, the cone of the transducer may thus limit the range area within which the transducer may transmit or receive ultrasonic waves. This may result in the transducer not detecting target values, for example, based on to the movements of the UAV that place the reflections outside of the range area.

Further, a single transducer may not always be able to accurately detect target values, even when those target values are within a range area associated with that transducer. For example, the UAV may include a vision-based navigation system. If the UAV flies over two different objects of varying height, the transducer may detect target values (e.g., one for each object), but not be able to put the different target values into context. That is, the reflections from the taller object will be detected more quickly than the target values from the shorter object, and the taller object may therefore appear to be moving more quickly with respect to the UAV. Ultimately, this may result in the vision-based navigation system associating unrelated pixel motion with those target values, such as because not enough target values were detected to confidently identify the position of an object with respect to the UAV.

Implementations of this disclosure address problems such as these using multiple transducers having different beam patterns with a UAV. The UAV includes a first transducer that transmits a first ultrasonic signal and receives a first ultrasonic response and a second transducer that transmits a second ultrasonic signal and receives a second ultrasonic response. The second transducer has a wider beam pattern than the first transducer. Determinations are made as to whether either or both of the first or second ultrasonic responses includes a target value within range areas associated with the respective beam patterns of the first and second transducers. For example, a second range area associated with the second transducer may be larger than and include a first range area associated with the first transducer. Based on the determinations, a confidence value is generated to indicate whether the target value is detected using either or both of the first or second transducers. The confidence value indicates a likelihood of a position of the unmanned aerial vehicle with respect to the object. The confidence value may be updated based on subsequently detected target values.

The implementations of this disclosure will now be described in detail with reference to the drawings that are provided as illustrative examples to enable those skilled in the art to practice the technology. The figures and examples below are not meant to limit the scope of this disclosure to a single implementation, but other implementations are possible by way of interchange of or combination with some or all of the described or illustrated elements. Wherever convenient, the same reference numbers will be used throughout the drawings to refer to same or like parts.

FIG. 1A shows an example of a UAV 100. In this implementation, the UAV 100 has a quad-copter configuration, that is, the UAV 100 includes four rotors 102. Each rotor 102 is driven by a separate electric motor (not shown). However, the UAV 100 may be any form of an aerial vehicle.

A battery pack (not shown) mounted on or in a body of the UAV 100 may supply electrical power to all four electric motors, flight electronics (not shown) associated with operation of UAV 100, and an imaging device 104 that provides still and video images by means of a communication link (not shown) to a ground-based user. The imaging device 104 may be coupled to a front of the UAV 100 using, for example, a movement mechanism 106.

In FIG. 1A, the movement mechanism 106 removably mounts the imaging device 104 to the UAV 100. The implementation of the movement mechanism 106 shown in this example is a three-axis gimbal that permits the imaging device 104 to be rotated about three independent axes. However, the movement mechanism 106 may include any type of translational and/or rotational elements that permit rotational and/or translational movement in one, two, or three dimensions of the imaging device 104 in respect to the UAV 100.

Figure 1B:
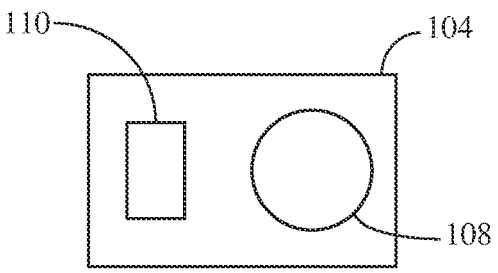
FIG. 1B shows an example of the imaging device associated with the UAV.

FIG. 1B shows an example of the imaging device 104 associated with the UAV 100. In FIG. 1B, the imaging device 104 is a GoPro Hero4® or Hero5® camera, however any type of imaging device 104 that can be coupled to the UAV 100, for example, through use of the movement mechanism 106, may be utilized. The imaging device 104 may include still image and video capture capabilities. FIG. 1B shows a lens 108 of the imaging device 104 and a display screen 110 associated with the imaging device 104. Means for coupling the imaging device 104 to the UAV 100 and/or the movement mechanism 106 are not shown.

Figure 1C:
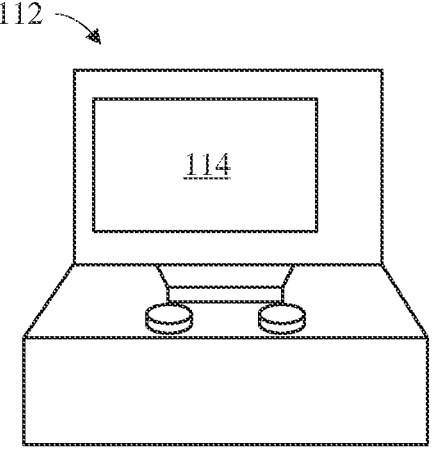
FIG. 1C shows an example of a remote controller and user interface for the UAV.

FIG. 1C shows an example of a remote controller 112 including a user interface 114 for operating the UAV 100. The remote controller 112 may include a communications interface (not shown) via which the remote controller 112 may receive and send commands related to operation of the UAV 100, the imaging device 104, and the movement mechanism 106. The commands can include movement commands, configuration commands, operational control commands, and imaging commands. In some implementations, the remote controller 112 may be a smartphone, a tablet computer, a phablet, a smart watch, a portable computer, and/or another device configured to receive user input and communicate information with the imaging device 104, the movement mechanism 106, and/or the UAV 100.

For example, flight direction, attitude, and altitude of the UAV 100 may all be controlled by controlling speeds of the motors that drive the respective rotors 102 of the UAV 100. During flight, a GPS receiver on the UAV 100 may provide navigational data to the remote controller 112 for use in determining flight paths and displaying current location through the user interface 114. A vision-based navigation system may also be implemented that tracks visually significant features through image data captured by the imaging device 104 to provide the necessary speed and position of the UAV 100 to the remote controller 112.

The communications interface may utilize any wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the communications interface may be effectuated using a wired interface, e.g., HDMI, USB, digital video interface, display port interface (e.g., digital display interface developed by the Video Electronics Standards Association (VESA), Ethernet, Thunderbolt), and/or other interface.

The remote controller 112 may operate a software application (e.g., GoPro Studio®, GoPro App®, and/or other application) configured to perform a variety of operations related to camera configuration, positioning of the movement mechanism 106, control of video acquisition, and/or display of video captured by the imaging device 104 through the user interface 114. An application (e.g., GoPro App®) may enable a user to create short video clips and share video clips to a cloud service (e.g., Instagram®, Facebook®, YouTube®, Dropbox®); perform full remote control of functions of the imaging device 104; live preview video being captured for shot framing; mark key moments while recording (e.g., HiLight Tag®, View HiLight Tags in GoPro Camera Roll®) for location and/or playback of video highlights; wirelessly control camera software; and/or perform other functions. Various methodologies may be utilized for configuring the imaging device 104 and/or displaying the captured information.

Figure 2:
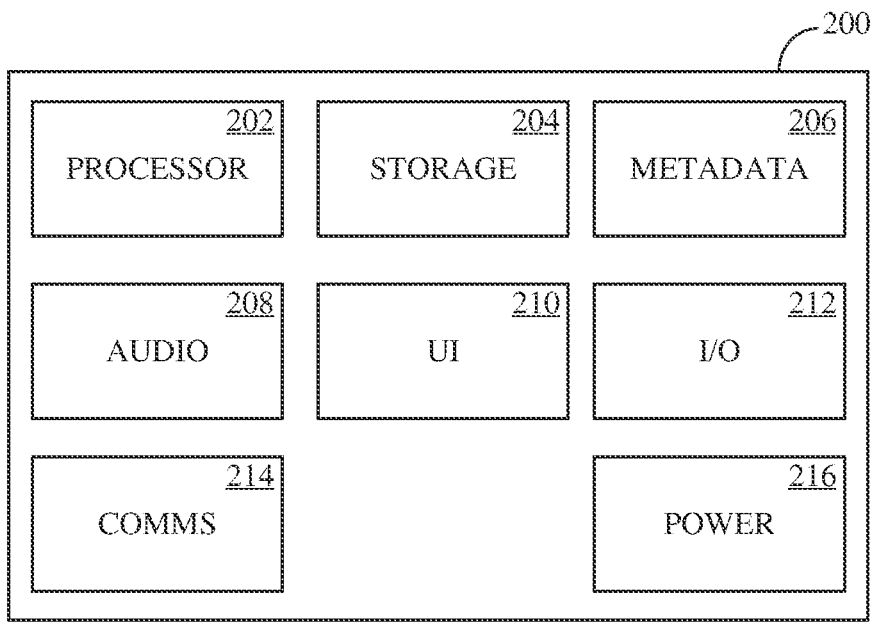
FIG. 2 is a block diagram illustrating components of a computing device.

FIG. 2 is a block diagram illustrating components of a computing device 200. The computing device 200 may be a single component of the UAV 100, the imaging device 104, the movement mechanism 106, or the remote controller 112. The computing device 200 may be multiple computing devices distributed in various ways between the UAV 100, the imaging device 104, the movement mechanism 106, or the remote controller 112. In the examples described, the computing device 200 may provide communication and control functions to the various components described in reference to FIGS. 1A, 1B, and IC.

The computing device 200 may include a processor 202. The processor 202 may include a system on a chip (SoC), microcontroller, microprocessor, CPU, DSP, ASIC, GPU, or other processors that control the operation and functionality of the UAV 100, the imaging device 104, the movement mechanism 106, and/or the remote controller 112. The processor 202 may interface with mechanical, electrical, sensory, and power modules via driver interfaces and software abstraction layers. Additional processing and memory capacity may be used to support these processes. These components may be fully controlled by the processor 202. In some implementations, one or more components may be operable by one or more other control processes (e.g., a GPS receiver may include a processing apparatus configured to provide position and motion information to the processor 202 in accordance with a given schedule (e.g., values of latitude, longitude, and elevation at 10 Hz.))

The computing device 200 may also include electronic storage 204 in which configuration parameters, image data, and/or code for functional algorithms may be stored. The electronic storage 204 may include a system memory module that is configured to store executable computer instructions that, when executed by the processor 202, control various functions of the UAV 100, the imaging device 104, the movement mechanism 106, and/or the remote controller 112. The electronic storage 204 may also include storage memory configured to store content (e.g., metadata, frames, video, and audio) captured by the imaging device 104 or sensors associated with the UAV 100, the movement mechanism 106, and/or the remote controller 112.

The electronic storage 204 may include non-transitory memory (e.g., a non-transitory computer-readable storage medium) configured to store configuration information (e.g., processor-executable routines) and processing code configured to enable video information and metadata capture. The configuration information may include capture type (video, frames), image resolution, frame rate, burst setting, white balance, recording configuration (e.g., loop mode), audio track configuration, and other parameters that may be associated with audio, video, and metadata capture. Additional electronic storage 204 may be available for other hardware, firmware, or software needs of the UAV 100, the imaging device 104, the movement mechanism 106, and/or the remote controller 112. The memory and processing capacity may aid in management of processing configuration (e.g., loading, replacement) operations during a startup and/or other operations.

The computing device 200 may include or be in communication with metadata sources 206. The metadata sources 206 may include sensors associated with the UAV 100, the imaging device 104, and/or the movement mechanism 106. The sensors may include an inertial measurement unit (IMU), an accelerometer, a gyroscope, a barometer, a magnetometer, a compass, a LIDAR sensor, a global positioning satellite (GPS) receiver, an altimeter, an ambient light sensor, a temperature sensor, a pressure sensor, a heart rate sensor, a depth sensor (such as radar, an infra-red-based depth sensor, such as a Kinect-style depth sensor, and a stereo depth sensor), and/or other sensors. The imaging device 104 may also provide metadata sources 206, e.g., image sensors, a battery monitor, storage parameters, and other information related to camera operation and capture of content. The metadata sources 206 may obtain information related to an environment of the UAV 100 and aspects in which the content is captured.

By way of a non-limiting example, an accelerometer may provide motion information including acceleration vectors from which velocity vectors may be derived, and a barometer may provide pressure information from which elevation may be derived. A gyroscope may provide orientation information, a GPS sensor may provide GPS coordinates and time for identifying location, and an altimeter may obtain altitude information. The metadata sources 206 may be rigidly coupled to the UAV 100, the imaging device 104, the movement mechanism 106, and/or the remote controller 112 such that the processor 202 may be operable to synchronize various types of information received from various types of metadata sources 206.

For example, using timing information, metadata information may be related to content (frame or video) captured by an image sensor. In some implementations, the metadata capture may be decoupled from the video or frame capture. That is, metadata may be stored before, after, and in-between one or more video clips or frames. In one or more implementations, the processor 202 may perform operations on the received metadata to generate additional metadata information. For example, the processor 202 may integrate received acceleration information to determine a velocity profile of the imaging device 104 during a recording of a video.

The computing device 200 may include or be in communication with audio sources 208, such as one or more microphones, configured to provide audio information that may be associated with images acquired by the imaging device 104 or commands provided by the remote controller 112. Two or more microphones may be combined to form a microphone system that is directional. Such a directional microphone system can be used to determine the location of a sound source and to eliminate undesirable noise originating in a particular direction. Various audio filters may be applied as well. In some implementations, audio information may be encoded using AAC, AC3, MP3, linear PCM, MPEG-H, and other audio coding formats (audio codec.) In one or more implementations of spherical video and audio, the audio codec may include a 3-dimensional audio codec. For example, an Ambisonics codec can produce full surround audio including a height dimension. Using a G-format Ambionics codec, a special decoder may not be required.

The computing device 200 may include or be in communication with a user interface (UI) 210. The UI 210 may include a display configured to provide information related to operation modes (e.g., camera modes, flight modes), connection status (e.g., connected, wireless, wired), power modes (e.g., standby, sensor, video), metadata sources 206 (e.g., heart rate, GPS, barometric), and/or other information associated with the UAV 100, the imaging device 104, the movement mechanism 106, and/or the remote controller 112. In some implementations, the UI 210 may include virtually any device capable of registering inputs from and communicating outputs to a user. These may include, without limitation, display, touch, gesture, proximity, light, sound receiving/emitting, wired/wireless, and/or other input/output devices. The UI 210 may include a display, one or more tactile elements (e.g., joysticks, switches, buttons, and/or virtual touch screen buttons), lights (e.g., LED, LCD, or the like), speakers, and/or other interface elements.

The UI 210 may be configured to enable the user to provide commands to the UAV 100, the imaging device 104, and/or the movement mechanism 106. For example, the user interface 114 shown in FIG. 1C is one example of the UI 210. User commands provided using the UI 210 may be encoded using a variety of approaches, including but not limited to duration of a button press (pulse width modulation), number of button presses (pulse code modulation), or a combination thereof. For example, two short button presses through the UI 210 may initiate a sensor acquisition mode. In another example, a single short button press may be used to communicate (i) initiation of video or frame capture and cessation of video or frame capture (toggle mode) or (ii) video or frame capture for a given time duration or number of frames (burst capture). Other user command or communication implementations may also be realized, such as one or more short or long button presses or toggles of a joystick.

The computing device 200 may include an input/output (I/O) module 212. The I/O module 212 may be configured to synchronize the imaging device 104 with the remote controller 112, a second capture device, a smartphone, and/or a video server. The I/O module 212 may be configured to communicate information to and from various I/O components. The I/O module 212 may include a wired or wireless communications interface (e.g., Wi-Fi, Bluetooth, USB, HDMI, Wireless USB, Near Field Communication (NFC), Ethernet, a radio frequency transceiver, and other interfaces) configured to communicate to one or more external devices. The I/O module 212 may interface with LED lights, a display, a button, a microphone, speakers, and other I/O components. In one or more implementations, the I/O module 212 may be coupled to an energy source such as a battery or other DC electrical source.

The computing device 200 may include a communication module 214 coupled to the I/O module 212. The communication module 214 may include a component (e.g., a dongle) having an infrared sensor, a radio frequency transceiver and antenna, an ultrasonic transducer, and/or other communications interfaces used to send and receive wireless communication signals. In some implementations, the communication module 214 may include a local (e.g., Bluetooth, Wi-Fi, or the like) or broad range (e.g., 3G, Long Term Evolution (LTE) or the like) communications interface configured to enable communications between the UAV 100, the imaging device 104, the movement mechanism 106, and/or the remote controller 112.

The communication module 214 may employ communication technologies including one or more of Ethernet, 802.11, worldwide interoperability for microwave access (WiMAX), 3G, LTE, digital subscriber line (DSL), asynchronous transfer mode (ATM), InfiniBand, PCI Express Advanced Switching, and/or other communication technologies. By way of non-limiting example, the communication module 214 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the communication module 214 may be represented using formats including one or more of hypertext markup language (HTML), extensible markup language (XML), and/or other formats. One or more exchanges of information between the imaging device 104 and outside devices, such as the remote controller 112, may be encrypted using encryption technologies including one or more of secure sockets layer (SSL), transport layer security (TLS), virtual private networks (VPNs), Internet Protocol security (IPsec), and/or other encryption technologies.

The computing device 200 may include a power system 216 that may moderate a power supply based on the needs of the UAV 100, the imaging device 104, the movement mechanism 106, and/or the remote controller 112. For example, a battery, solar cell, inductive (contactless) power source, rectification, or other power supply housed within the UAV 100 may be controlled by the power system 216 to supply power for the imaging device 104 and/or the movement mechanism 106 when in a coupled state as shown in FIG. 1A.

Implementations of the computing device 200 may include additional, fewer, or different components than shown in FIG. 2. In some implementations, the computing device 200 may include optics. For example, the optics may include a lens, such as the lens 108 shown in FIG. 1B. The lens may, for example, include a standard lens, macro lens, fisheye lens, zoom lens, special-purpose lens, telephoto lens, prime lens, achromatic lens, apochromatic lens, process lens, wide-angle lens, ultra-wide-angle lens, infrared lens, ultraviolet lens, perspective control lens, or the like.

In some implementations, the computing device 200 may include an image sensor. For example, the image sensor may be a charge-coupled device (CCD) sensor, active pixel sensor (APS), complementary metal-oxide semiconductor (CMOS) sensor, N-type metal-oxide-semiconductor (NMOS) sensor, or the like, or a combination thereof. The image sensor may be configured to capture light waves gathered by optics of the computing device 200 and generate image data based on control signals from a sensor controller. For example, the optics may include focus controller functionality configured to control the operation and configuration of a lens, such as for receiving light from an object and transmitting the received light to the image sensor. The image sensor may use the received light to generate an output signal conveying visual information regarding an object. For example, the visual information may include one or more of an image, a video, and other visual information.

Figure 3:
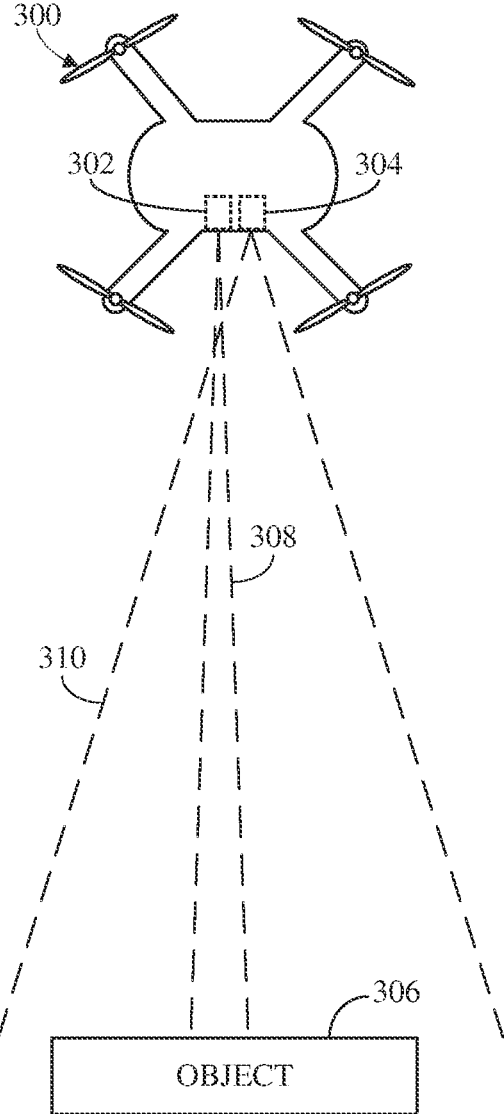
FIG. 3 shows an example of ultrasonic waves transmitted from and received at a UAV.

FIG. 3 shows an example of ultrasonic waves transmitted from and received at a UAV 300. The UAV 300 may, for example, be the UAV 100 shown in FIG. 1A. The UAV 300 includes a first transducer 302 and a second transducer 304. Each of the first transducer 302 and the second transducer 304 can be a piezo-electric element, such as a crystal. Each of the first transducer 302 and the second transducer 304 is configured to transmit and receive ultrasonic waves, such as ultrasonic signals and ultrasonic responses.

An ultrasonic signal includes ultrasonic waves used to determine a positional relationship between the UAV 300 and an object 306. The object 306 is an object over which the UAV 300 can be operated. For example, the object 306 can be an outdoor element (e.g., a portion of ground or earth, topographical phenomenon, building, or the like) or an indoor element (e.g., a portion of floor, stairs, or the like). The first transducer 302 and/or the second transducer 304 can transmit an ultrasonic signal to the object 306. In response to the ultrasonic signal, the first transducer 302 and/or the second transducer 304 can receive an ultrasonic response. An ultrasonic response includes ultrasonic waves reflected from the object 306. In particular, the ultrasonic waves of the ultrasonic response may include one or more target values indicative of a position of the object 306 with respect to the UAV 300 (e.g., a distance between the UAV 300 and the object 306). A target value may be a binary indication that an object is detected. For example, the inclusion of a target value in an ultrasonic response indicates that the object 306 is within a field-of-view range of a (e.g., one of the first transducer 302 or the second transducer 304). However, when that ultrasonic response does not include a target value, there may be an indication that the object 306 is not within the field-of-view range of that transducer.

The first transducer 302 and/or the second transducer 304 can transmit an ultrasonic signal upon being driven, such as by drive circuitry of the UAV 300. Drive circuitry can include hardware and/or software components configured to excite the driven transducer (e.g., the first transducer 302 and/or the second transducer 304), such as by communicating some amount of voltage to the driven transducer. After the communication of the voltage to the driven transducer stops, the drive transducer experiences a decaying, mechanical vibrational effect, which is referred to as ringing. The period of time between when the ringing begins and stops is referred to as a ring-down time. Each of the first transducer 302 and the second transducer 304 may have a particular ring-down time associated with it, such as based on the composition thereof, the manufacturing process therefor, other factors, or the like, or a combination thereof. For example, a ring-down time may be characteristic of a transducer, such as based on the way that transducer was manufactured. In another example, a ring-down time may be artificially associated with a transducer. An average ring-down time may be determined based on a sample of transducers, and an artificial ring-down time may be associated with a transducer based on the average value and some degree of variance.

An ultrasonic signal is transmitted from one of the first transducer 302 or the second transducer 304 using levels of outputs of the UAV 300. For example, the UAV 300 may include hardware and/or software components for measuring or otherwise adjusting one or more of a gain value, wave count, output power, frequency, or the like. The hardware components of the UAV 300 may include a gain amplifier (e.g., of an analog front end (AFE)), an analog-to-digital converter (ADC), a signal processor, or the like, or a combination thereof. The signal processor may include software components such as a target detection mechanism and a confidence mechanism. The target detection mechanism may be configured to determine whether an ultrasonic response received using one of the first transducer 302 or the second transducer 304 includes a target value. The confidence mechanism may be configured to generate a confidence value indicative a likelihood of a position of the UAV 300 with respect to the object 306, such as based on the detection or lack of detection of a target value within an ultrasonic response. One or more of the components of the UAV 300 may be included in an integrated circuit (IC).

The first transducer 302 transmits ultrasonic signals and receives ultrasonic responses using a first beam pattern. The second transducer 304 transmits ultrasonic signals and receives ultrasonic responses using a second beam pattern. Each of the first beam pattern and the second beam pattern may have a different directivity. For example, the second beam pattern may be wider than the first beam pattern. The quality of a beam pattern being wide or narrow may refer to the wide or narrow sensitivity of the transducer that uses that beam pattern for transmitting or receiving ultrasonic waves. A transducer may be associated with a range area that is based on the directivity of a beam pattern. For example, the first transducer 302 is associated with the first range area 308 and the second transducer 304 is associated with the second range area 310. A beam pattern such as the first beam pattern or the second beam pattern may have a generally circular cross-section. Alternatively, the cross-section of a beam pattern may be generally oblong, square, or the like. In a further alternative, the cross-section of a beam pattern may not have the same angle along the central axis thereof. The size of a beam pattern, such as the first beam pattern used by the first transducer 302 or the second beam pattern used by the second transducer 304, may be based on the transducer that uses the beam pattern. For example, where the transducer is configured using a cone or other rigid structure defining a specific cone angle for transmitting and receiving ultrasonic waves, the size of the beam pattern used by that transducer may be limited by that cone angle. In another example, where the transducer does not include a cone or other rigid structure defining a specific cone angle for transmitting and receiving ultrasonic waves, the size of the beam pattern used by that transducer may be configurable.

The first range area 308 represents the geometric region of space within which the first transducer 302 may transmit or receive ultrasonic waves. The second range area 310 represents the geometric region of space within which the second transducer 304 may transmit or receive ultrasonic waves. The first range area 308 and the second range area 310 may be non-overlapping. Alternatively, and as shown in FIG. 3, the first range area 308 and the second range area 310 may be overlapping. For example, cross-sectional areas of the beam patterns (e.g., circles) representing the portion of the respective range areas abutting the object 306 may be substantially concentric. For example, the second range area 310 may be larger than and include the first range area 308. The sizes of the first range area 308 and the second range area 310 may change based on the altitude of the UAV 300, for example, because the beam patterns associated therewith will have larger fields of view at higher altitudes.

Implementations of the UAV 300 may include additional, fewer, or different components than shown in FIG. 3. In some implementations, the first transducer 302 and the second transducer 304 may be generally next to one another in the UAV 300, such as shown in FIG. 3. In some implementations, the first transducer 302 and the second transducer 304 may be located in other places of the UAV 300. For example, a housing for the first transducer 302 may be located within a housing for the second transducer 304, such that the first transducer 302 and the second transducer 304 may be substantially concentric. For example, one of the first transducer 302 or the second transducer 304 may be embedded within the other. In some implementations, only one of the first transducer 302 or the second transducer 304 may transmit ultrasonic signals. For example, the second transducer 304 may alone be configured for transmitting ultrasonic signals for the UAV 300, such as because the second transducer 304 uses a wider beam pattern than the first transducer 302. However, both of the first transducer 302 and the second transducer 304 may be configured for receiving ultrasonic responses to the ultrasonic signals transmitted from the second transducer 304.

Figure 4:
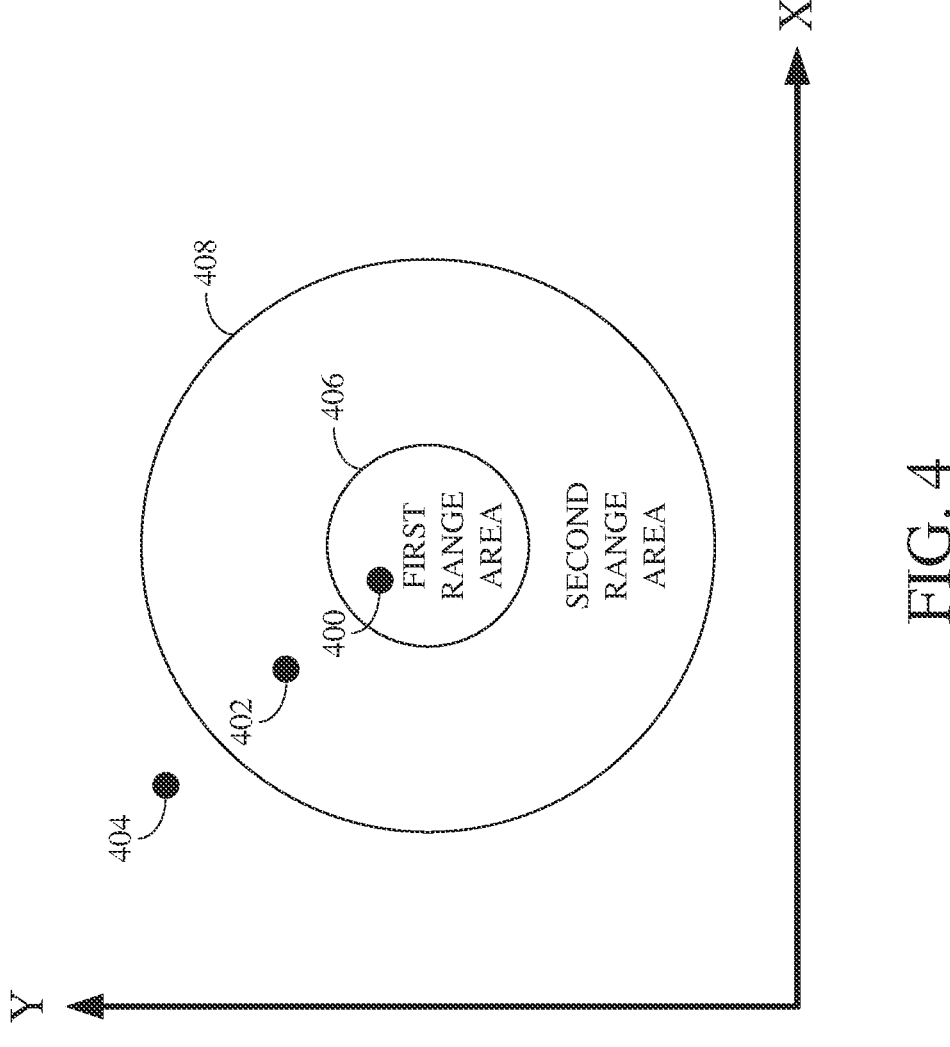
FIG. 4 is an illustration of target values detected using transducers of a UAV.

FIG. 4 is an illustration of target values 400, 402, 404 detected using transducers of a UAV. For example, the UAV can be the UAV 300 shown in FIG. 3, and the transducers can include a first transducer and a second transducer, such as the first transducer 302 and the second transducer 304 shown in FIG. 3. The first transducer is associated with a first range area 406, which may, for example, be the first range area 308 shown in FIG. 3. The second transducer is associated with a second range area 408, which may, for example, be the second range area 310 shown in FIG. 3.

A confidence value can be generated based on the detection of a target value (e.g., one of the target values 400, 402, or 404) within one, both, or neither of the first range area 406 or the second range area 408. As described above, the confidence value indicates a likelihood of a position of a UAV with respect to an object from which the target value is reflected. For example, the confidence value can indicate a high confidence that the object is below the UAV when the target value is detected within both of the first range area 406 and the second range area 408 (e.g., such that the target value is detected using both of the first transducer and the second transducer). In another example, the confidence value can indicate a medium confidence that the object is below the UAV when the target value is detected within only the second range area 408 (e.g., such that the target value is detected using the second transducer and not using the first transducer). In yet another example, the confidence value can indicate a high confidence that the object is not below the UAV (or, stated another way, a low confidence that the object is below the UAV) when no target value is detected within the first range area 406 or the second range area 408 (e.g., such that a target value is not detected using the first transducer or using the second transducer).

An object may be considered to be below the UAV when a location of the object in a three-dimensional space is below a location of the UAV in that three-dimensional space. The location of the UAV may be defined in a three-dimensional space by the range (X, Y, Z) to (X+N, Y, Z+M), where X represents an X-axis position, Y represents a Y-axis position, Z represents a Z-axis position, N represents a translation along the X-axis, and M represents a translation along the Z-axis. An object is below the UAV where the location of the object is defined in the three-dimensional space at (X+A, Y−B, Z+C), where A is a translation along the X-axis that is less than or equal to N, B is a translation along the Y-axis, and C is a translation along the Z-axis that is less than or equal to M.

The confidence value generated based on the detection of a target value using one, both, or neither of the first transducer or the second transducer may be associated with a statistical probability range. For example, a low confidence can be associated with the statistical probability range of 0 percent to 33 percent. A medium confidence can be associated with the statistical probability range of 34 percent to 66 percent. A high confidence can be associated with the statistical probability range of 67 percent to 100 percent. Other ranges may be defined for low, medium, and high confidences. For example, the ranges may not be of equal sizes.

The target value 400 represents a reflection from an object, which reflection is included within a first ultrasonic response received using the first transducer and within a second ultrasonic response received using the second transducer. The target value 400 is within the first range area 406, and, therefore, also within the second range area 408. Because the target value 400 is detected using both of the first transducer and the second transducer, a confidence value can be generated indicating a high confidence that the object from which the target value 400 is reflected is below the UAV.

The target value 402 represents a reflection from an object, which reflection is included in the second ultrasonic response received using the second transducer and not within the first ultrasonic response received using the first transducer. This is because the target value 402 is within the second range area 408 and not within the first range area 406. As such, a confidence value can be generated indicating a medium confidence that the object from which the target value 402 is reflected is below the UAV.

The target value 404 represents a reflection from an object that is not included within an ultrasonic response received using the first transducer or the second transducer. That is, because the target value 404 is not within either of the first range area 406 or the second range area 408, the target value 404 may not be detected. As such, the target value 404 may not be used to generate a confidence value. Alternatively, a confidence value may be generated indicating a high confidence that neither of the first transducer or the second transducer detected a target value. As a further alternative, where the one or both of the first transducer or the second transducer is configured to detect target values even outside of their respective range areas, the confidence value generated based on the target value 404 can indicate a low confidence that the target value 404 is below the UAV.

This multi-transducer system may be advantageous in multiple settings. For example, in the context of a vision system (e.g., a vision-based navigation system of the UAV), the ultrasonic waves transmitted and received using the transducers may be used to augment feature tracking. For example, when different features move in a video frame at different pixel rates, a vision system may use information indicating the levels of those objects to properly put the pixel motion of the video frame into context. Using the first and second transducers and the corresponding first range area 406 and second range area 408, the UAV is able to more confidently provide the motion context for the vision system.

For example, the target value 400 can be associated with pixel motion closer to the center of the video frame, whereas the target value 402 may be associated with pixel motion slightly closer to the fringes of the video frame. Over brief periods of time (e.g., based on a series of ultrasonic waves transmitted over one or two seconds), confidence values generated for the target values can be updated to reflect a greater likelihood that those target values are in the correct positions of the video frame.

Figure 5:
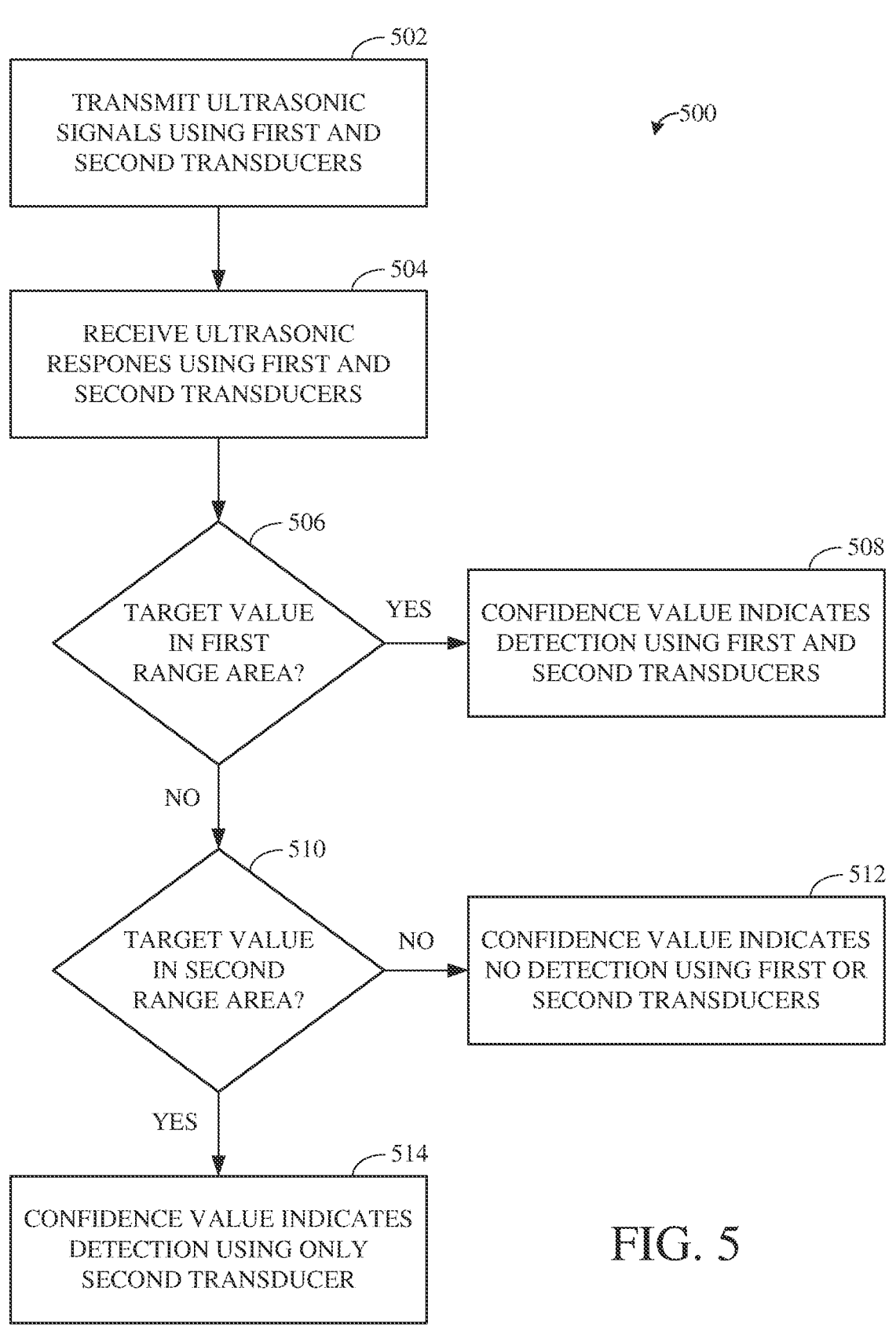
FIG. 5 is a flowchart showing an example of a technique for target value detection.

FIG. 5 is a flowchart showing an example of a technique 500 for target value detection. The technique 500 can be performed, for example, using hardware and/or software components of a UAV, such as the UAV 300 shown in FIG. 3. Although the technique 500 is described with respect to a series of operations, the operations comprising the technique 500 may be performed in orders other than those described herein. In some implementations, the technique 500 may include additional, fewer, or different operations than described herein.

At 502, ultrasonic signals are transmitted using first and second transducers of a UAV. For example, the first and second transducers and the UAV may respectively be the first transducer 302, the second transducer 304, and the UAV 300 shown in FIG. 3. Transmitting the ultrasonic signals using the first transducer and the second transducer can include instructing the first transducer to transmit a first ultrasonic signal using a first beam pattern and the second transducer to transmit a second ultrasonic signal using a second beam pattern. For example, drive circuitry of the UAV (described in further detail below with respect to FIG. 6) may cause the first transducer and the second transducer to respectively transmit the first ultrasonic signal and the second ultrasonic signal. The second beam pattern may be wider than the first beam pattern. As such, the second transducer may be configured with a larger range area for transmitting and receiving ultrasonic waves than the first transducer.

At 504, ultrasonic responses are received using the first and second transducers. Receiving the ultrasonic responses can include receiving a first ultrasonic response using the first transducer responsive to the first ultrasonic signal transmitted using the first transducer, and receiving a second ultrasonic response using the second transducer to the second ultrasonic signal transmitted using the second transducer. For example, the first ultrasonic response may be received using the first beam pattern of the first transducer and the second ultrasonic response may be received using the second beam pattern of the second transducer. The first and second ultrasonic responses may be received using receive circuitry, which may, for example, be configured to instruct the transducers to receive ultrasonic signals.

Determinations are then made as to whether the first ultrasonic response includes a target value within a first range area associated with the first transducer and whether the second ultrasonic response includes the target value within a second range area associated with the second transducer. The first range area is a region of space defined by the first beam pattern and the second range area is a region of space defined by the second beam pattern. For example, the first range area and the second range area may respectively be the first range area 406 and the second range area 408 shown in FIG. 4. The second range area is larger than and includes the first range area. For example, the second range area may include an inner region and an outer region, and the inner region may correspond to the first range area. A determination as to whether an ultrasonic response includes a target value can be performed using a filter, such as to process the target value with respect to the UAV. For example, the filter can be a complementary filter, a Kalman filter, an averaging filter, or the like.

Responsive to those determinations, a confidence value is generated. The confidence value indicates a likelihood of a position of the UAV with respect to an object from which the target value is reflected, for example, the object 306 shown in FIG. 3. For example, the target value can be a reflection of an ultrasonic wave included in an ultrasonic signal transmitted using one or both of the first transducer or the second transducer. The target value may be within one, both, or neither of the first ultrasonic response or the second ultrasonic response. As such, the target value may be detected using one, both, or neither of the first transducer or the second transducer.

At 506, a determination is made as to whether the first ultrasonic response includes the target value within the first range area and whether the second ultrasonic response includes the target value within an inner region of the second range area. For example, the determinations at 506 can include determining whether both of the first and second ultrasonic responses include the target value. That is, the first ultrasonic response may be confined to the first range area and the second ultrasonic response may be confined to the second range area. The detection of a target value within a range area (e.g., the first range area or the second range area) may be binary such that the target value is either detected within that range area or it is not. For example, the determination in regard to the second ultrasonic response is as to whether a target value is detected within the second range area at all, and not whether the target value is detected specifically within the inner region thereof. The determinations at 506 thus consider whether the target value was detected using the first transducer and the second transducer.

At 508, responsive to determining that the first ultrasonic response includes the target value within the first range area and determining that the second ultrasonic response includes the target value within the inner region of the second range area, a confidence value is generated to indicate that the target value is detected using the first transducer and is detected using the second transducer. The confidence value generated at 508 can indicate a high likelihood that the object that reflected the target value is below the UAV.

At 510, responsive to determining that the first ultrasonic response does not include the target value within the first range area and determining that the second ultrasonic response does not include the target value within the inner region of the second range area, a determination is made as to whether the second ultrasonic response includes the target value within the outer region of the second range area. For example, it is determined that the target value is not within the first range area associated with the first transducer, and so the target value is not detected using the first transducer. However, the target value may be within the second range area associated with the second transducer (e.g., a portion of the second range area not corresponding to the first range area). As described above, the detection of a target value within the second range area may be binary such that the determination at 510 is as to whether the second ultrasonic response includes a target value within the second range area, and not whether the target value is specifically within the outer region.

At 512, responsive to determining that the first ultrasonic response does not include the target value within the first range area and determining that the second ultrasonic response does not include the target value within the second range area, a confidence value is generated to indicate that the target value is not detected using the first transducer and is not detected using the second transducer. The confidence value generated at 512 can indicate a high confidence that the object that reflected the target value is not below the UAV. Alternatively, generating a confidence value at 512 may not include generating a confidence value, such as because no target value has been detected using the first transducer or the second transducer.

At 514, responsive to determining that the first ultrasonic response does not include the target value within the first range area and determining that the second ultrasonic response includes the target value within the second range area (e.g., the outer region thereof), a confidence value is generated to indicate that the target value is detected using the second transducer and is not detected using the first transducer. The confidence value generated at 514 can indicate a medium confidence that the object that reflected the target value is below the UAV.

The technique 500 may repeat while the UAV remains in operation. For example, the confidence values generated based on the detections of target values can be updated over time, such as based on subsequent detections of target values. For example, the statistical probability indicated by a confidence value can be increased when subsequent detections indicate the same detection as was used to generate the confidence value. Similarly, that statistical probability can be decreased when subsequent detections do not indicate the same detection was used.

For example, a confidence value may be generated based on one ultrasonic response indicates that a target value is detected using only the second transducer. That confidence value may increase where the next ultrasonic response also indicates that a target value is detected using only the second transducer. However, that confidence value may instead decrease where that next ultrasonic response indicates that a target value is not detected using the second transducer. As such, where a confidence value already exists for a target value detection, generating a confidence value, such as at 508, 512, and/or 514 can include updating the existing confidence value based on new corresponding target values.

For example, where the confidence value is generated at 514, updating the existing confidence value can include using a modeling filter to generate a prediction for a second detection of the target value using the second transducer and not using the first transducer. The second detection of the target value may be based on an ultrasonic response received using the second transducer after the ultrasonic response received using it at 504. The confidence value generated at 514 may be updated responsive to the second detection of the target value using the second transducer and not using the first transducer. For example, the confidence value may be updated according to a weight associated with the prediction that was previously generated. Responsive to the updating, the confidence value indicates an increased likelihood of the position of the UAV with respect to the object that reflected the target value.

The modeling filter may include functionality for modeling outcomes of detections of target values using weighted statistical probabilities. For example, for each sample of target values taken at a given time $T_0$, a prediction can be generated to indicate what will be sampled and an evaluation of the data that will be sampled at a later time $T_{0+N}$. That is, information about the target values detected at a first time can be used to generate predictions for the target values that may be detected at a second time. Alternatively, the modeling filter may include functionality for identifying and removing outliers in the target value data included in an ultrasonic response. Responsive to removing outliers, the target value data can be combined with other target value data collected over some period of time to determine an average target value. A prediction can then be generated for a subsequently detected target value based on that average target value. As a further alternative, the modeling filter may include functionality for filtering the data included in one or more ultrasonic responses according to one or more characteristics of ultrasonic responses.

The prediction generated using the modeling filter can be compared to a target value that is later detected. For example, where the prediction is generated responsive to a first detection of a target value, the prediction can be compared to a second detection of the target value. If the comparison indicates that the prediction is not similar to the actually detected target value (e.g., based on a ratio threshold), the prediction may not be used. Not using the prediction in this way may include deleting the prediction from memory (e.g., such that it is not used in further comparisons) or updating the prediction (e.g., according to the second detection of the target value).

In some implementations, the technique 500 may include reducing a ring-down time for a transducer of the UAV. For example, a transducer (e.g., the first transducer or the second transducer described above) transmits an ultrasonic signal upon being driven, such as by drive circuitry of the UAV. The drive circuitry can include hardware and/or software components configured to excite the transducer, such as by communicating some amount of voltage to the transducer. After the communication of the voltage to the transducer stops, the transducer experiences a decaying, mechanical vibrational effect, which is referred to as ringing. As described above, the period of time between when the ringing begins and stops is referred to as a ring-down time. The transducer may have a particular ring-down time associated with it, such as based on the composition of the transducer, the manufacturing process for the transducer, other factors, or the like, or a combination thereof.

For example, a ring-down time for the first transducer can be reduced based on feedback of the first ultrasonic signal exceeding a saturation threshold, or a ring-down time for the second transducer can be reduced based on feedback of the second ultrasonic signal exceeding the saturation threshold. The reducing of a ring-down time of a transducer can be performed using a counter-drive mechanism. In another example, the counter-drive mechanism may perform operations to reduce the ring-down time of the transducer responsive to a transmission of an ultrasonic signal from the transducer. As such, it may not be necessary for the saturation threshold or another threshold to be exceeded or met before the ring-down time for a transducer is reduced. As will be described below with respect to FIG. 6, the counter-drive mechanism may use an open-loop feedback system or a closed-loop feedback system to act against the ringing of the first transducer or the second transducer, thereby reducing the ring-down time thereof. Reducing the ring-down time of a transducer may increase its refresh rate, resulting in its being ready to transmit a subsequent ultrasonic signal faster than if the ring-down time thereof was not reduced. Other benefits may also result from reducing the ring-down time of a transducer. For example, reducing the ring-down time of the transducer can reduce a minimum distance for detecting objects using the transducer. This is because the time over which the transducer becomes sensitive to target values is reduced as the ring-down time is reduced. In another example, reducing the ring-down time of the transducer can improve the accuracy of distances measured to or from objects, for example, for objects close enough to the UAV to have their target values be within a range area of the transducer before the ring-down time expires.

In some implementations, the strength of an ultrasonic response including a target value may affect how a resulting confidence value is generated. For example, the UAV may include functionality for determining a noise floor estimate, such as using a noise floor estimate mechanism. The noise floor estimation mechanism can listen to and measure a background level of noise within an environment including the UAV over a period of time (e.g., 65 milliseconds). That is, the noise floor estimate may indicate the sum of the noise within the environment in which the UAV operates. The noise values measured over the period of time can be used as input for a binary search performed over a gain space of the UAV to determine the noise floor estimate.

For example, performing the binary search can include determining a value of the gain space at which an ADC signal value meets a threshold. For example, the threshold can be a gain value at which the ADC reaches fifty percent use. A gain value of the gain space may be used as input to the binary search. For example, the gain value used as input can be a midpoint value of the minimum and maximum values of the gain space. Alternatively, the value used as input can be provided by a gain amplifier (e.g., of an AFE of the UAV).

After the initial input is set, the ADC can be used to take N (e.g., four or eight) noise measurement samples. The number of noise measurement samples taken may be larger in environments where there is a greater potential of noise variance, for example, outdoor environments. The noise measurement samples are measured according to the highest peak values thereof. There may be an arbitrary number of noise measurement samples used at each step of the binary search.

In the event the noise measurement samples indicate that the noise is at or near zero, another search is performed using the portion of the gain space including values greater than the initial input value. In the event the noise measurement samples indicate that the noise is saturated, another search is performed using the portion of the gain space including values lower than the initial input value. The binary search can be continued until the threshold is met, for example, when the binary search returns a value of the gain space at which the ADC is at fifty percent. As such, the number of steps performed by the binary search may not exceed the size of the gain space that is searched.

The noise floor estimate determined based on the binary search can be used to determine a strength of an ultrasonic response received using a transducer. The noise floor estimate can be compared to the ultrasonic response to determine a signal-to-noise ratio (SNR) for the ultrasonic response. For example, if the SNR is below a threshold, target values included in the ultrasonic response may not be used to generate a confidence value, such as because of the risk that they might be diluted by or otherwise merely represent noise. In another example, if the SNR indicates that the ultrasonic response is N (e.g., three) times stronger than the noise floor estimate, target values included in the ultrasonic response may be used to generate a confidence value. In yet another example, the SNR can be used to weight the degree to which the target value is used, such that a higher SNR would result in a greater weighting for using the target value to generate a confidence value.

In some implementations, the determinations made at 506 and/or 510 can be based not only on whether the target value is within the first range area or the second range area, but also based on a strength of the target value within the first range area or the second range area. For example, the target value may be determined to be within the first range area and the second range area. However, if the detection of the target value is weak within the first range area and strong within the second range area (e.g., based on a threshold), a determination may be made that the target value is within the second range area (e.g., the outer region thereof) and not within the first range area.

In some implementations, the technique 500 may include determinations other than those at 506 and 510. For example, the technique 500 may include determining whether the first ultrasonic response includes the target value within the first range area and determining whether the second ultrasonic response does not include the target value within the second range area. Responsive to determining that the first ultrasonic response includes the target value within the first range area and determining that the second ultrasonic response does not include the target value within the second range area, a confidence value can be generated indicating to not use the target value.

The detection of a target value using the first transducer and not using the second transducer indicates that an error may have occurred. For example, because the first transducer concentrates more energy into the first ultrasonic signal than the second transducer does with the second ultrasonic signal, the error may be due to a weak transmission of the second ultrasonic signal using too low of a gain value or burst count or a transmission of the first ultrasonic signal using a minimum or near-minimum amount of energy to cause an ultrasonic response to be returned. In another example, the error may be due to a software issue within the UAV.

Figure 6:
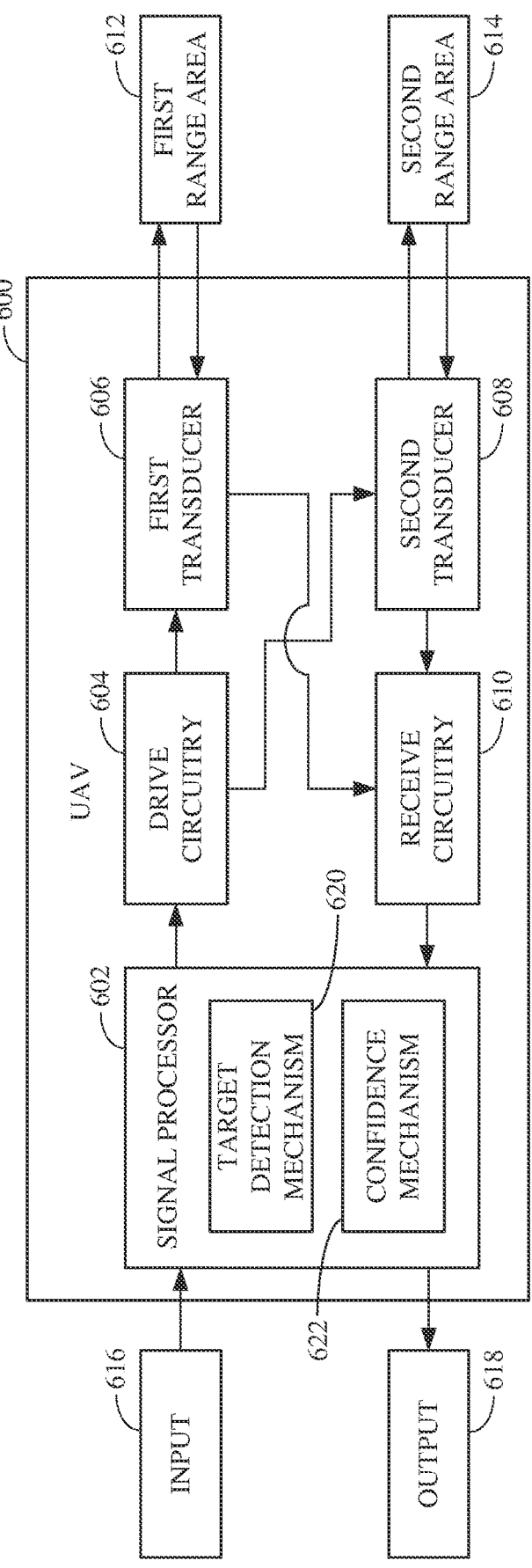
FIG. 6 is a block diagram illustrating an example of components of a UAV.

FIG. 6 is a block diagram illustrating an example of components of a UAV 600. The UAV 600 may, for example, be the UAV 300 shown in FIG. 3. The UAV 600 includes a signal processor 602, drive circuitry 604, a first transducer 606, a second transducer 608, and receive circuitry 610. The first transducer 606 and the second transducer 608 may, for example, respectively be the first transducer 302 and the second transducer 304 shown in FIG. 3.

The first transducer 606 is configured to use a first beam pattern to transmit an ultrasonic signal and receive an ultrasonic response within a first range area 612. The second transducer 608 is configured to use a second beam pattern to transmit an ultrasonic signal and receive an ultrasonic response within a second range area 614. The first range area 612 and the second range area 614 may, for example, respectively be the first range area 308 and the second range area 310 shown in FIG. 3. Although the first range area 612 and the second range area 614 are not shown as overlapping, they may overlap, such as shown with respect to the first range area 308 and the second range area 310. For example, the second range area 614 may include an inner region and an outer region, and the inner region may correspond to the first range area 612.

The signal processor 602 includes hardware and/or software components configured to process input 616 to and output 618 from the UAV 600. The signal processor 602 includes a target detection mechanism 620 and a confidence mechanism 622. The target detection mechanism 620 is configured to determine whether a target value is detected using the first transducer 606 based on a first range area associated with the first range area 612 and determine whether the target value is detected using the second transducer 608 based on a second range area associated with the second range area 614. For example, the target detection mechanism 620 can include functionality for performing operations for determining whether ultrasonic responses received using the first transducer 606 and the second transducer 608 include a target value, such as described at 506 and/or 508 in FIG. 5.

For example, when the first ultrasonic response includes a target value within the first range area 612 and the second ultrasonic response includes the target value within the second range area 614, (e.g., within an inner region thereof), the target detection mechanism 620 may determine that the target value is detected using the first transducer 606 and is detected using the second transducer 608. In another example, when the first ultrasonic response does not include the target value within the first range area 612 and the second ultrasonic response includes the target value within the second range area 614 (e.g., within an outer region thereof), the target detection mechanism 620 may determine that the target value is detected using the second transducer 608 and is not detected using the first transducer 606. In yet another example, when the first ultrasonic response does not include the target value within the first range area 612 and the second ultrasonic response does not include the target value within then second range area 614, the target detection mechanism 620 may determine that the target value is not detected using the first transducer 606 and is not detected using the second transducer 608.

The confidence mechanism 622 is configured to generate confidence values indicative detections of the target value using the first transducer 606 and using the second transducer 608 based on determinations by the target detection mechanism 620. For example, the confidence mechanism 622 can include functionality for performing operations for generating confidence values, such as described at 508, 512, and/or 514 in FIG. 5.

The signal processor 602 may, for example, include a microcontroller (e.g., an IC) including a processor coupled to a memory, such as for example, the processor 202 and the storage 204 shown in FIG. 2. For example, the microcontroller can include functionality for controlling operations performed by the components of the UAV 600 and the storage 204 (or other memory, as applicable) can include instructions executable to perform those operations. For example, the instructions stored in the storage 204 (or other memory) can include instructions comprising the target detection mechanism 620 and the confidence mechanism 622.

The drive circuitry 604 includes hardware and/or software components configured to cause the first transducer 606 to transmit an ultrasonic signal and cause the second transducer 608 to transmit another ultrasonic signal. For example, the drive circuitry 604 may include a printed circuit board (PCB), electronics for powering the first transducer 606 and/or the second transducer 608, or the like, or a combination thereof. The receive circuitry 610 includes hardware and/or software components configured to communicate the ultrasonic response received using the first transducer 606 and the ultrasonic response received using the second transducer 608 to the signal processor 602. The receive circuitry 610 may also be configured to instruct the first transducer 606 and the second transducer 608 to receive ultrasonic signals. For example, the receive circuitry 610 may include a PCB, a filter for processing ultrasonic responses received using the first transducer 606 and/or the second transducer 608, or the like, or a combination thereof.

The input 616 may include information usable to drive a transducer, detect a target value, generate a confidence value, or the like. For example, the input 616 may include data indicative of a position and/or orientation of the UAV 600. For example, where the input 616 indicates a sudden shift in the position or angular change in orientation of the UAV 600, the signal processor 602 may use the input 616 to offset the first range area 612 and/or the second range area 614 according to a directionality of that sudden shift. In another example, the signal processor 602 can use that input 616 to cause target values detected while that sudden shift occurs to be ignored, such that they are not used to generate or otherwise update confidence values.

The output 618 may include data indicative of detections of target values, generated confidence values, or the like. For example, the output 618 may include a report of target values detected using the first transducer 606, target values detected using the second transducer 608, target values detected using both of the first transducer 606 and the second transducer 608, and/or indications that target values were not detected using the first transducer 606 or the second transducer 608. In another example, the output 618 may include a report of confidence values generated based on the detections of target values using one, both, or neither of the first transducer 606 or the second transducer 608. For example, the output 618 may be reported to a server in communication with the UAV 600 (e.g., using a communications module, such as the communications module 214 shown in FIG. 2). In another example, the output 618 may be retrieved, such as using a secondary storage device removably inserted to a port of the UAV 600.

Implementations of the UAV 600 may include additional, fewer, or different components than shown in FIG. 6. In some implementations, the drive circuitry 604 may include first and second drive circuitries and the receive circuitry 610 may include first and second receive circuitries. For example, the first drive circuitry and the first receive circuitry can operate with respect to the first transducer 606 and the second drive circuitry and the second receive circuitry can operate with respect to the second transducer 608. For example, the first drive circuitry may be configured to cause the first transducer 606 to transmit a first ultrasonic signal. The first receive circuitry may be configured to communicate a first ultrasonic response to the first ultrasonic signal to the signal processor 602. The second drive circuitry may be configured to cause the second transducer 608 to transmit a second ultrasonic signal. The second receive circuitry may be configured to communicate a second ultrasonic response to the second ultrasonic signal to the signal processor 602. In some implementations, the drive circuitry 604 may act upon only one of the first transducer 606 or the second transducer 608. For example, the drive circuitry 604 can cause only the second transducer 608 to transmit ultrasonic signals. However, the receive circuitry 610 may cause either or both of the first transducer 606 or the second transducer 608 to receive an ultrasonic response to the ultrasonic signal transmitted using the second transducer 608.

In some implementations, the UAV 600 can include a counter-drive mechanism. For example, the counter-drive mechanism may be configured to reduce a ring-down time for the first transducer 606 responsive to a determination that feedback of an ultrasonic signal transmitted using the first transducer 606 exceeds a saturation threshold. In another example, the counter-drive mechanism may be configured to reduce a ring-down time for the second transducer 608 responsive to a determination that feedback of an ultrasonic signal transmitted using the second transducer 608 exceeds the saturation threshold. For example, the counter-drive mechanism can implement a feedback path for the first transducer 606 or the second transducer 608 to detect a state thereof. Upon saturation being detected (e.g., based on the saturation threshold being exceeded), the counter-drive mechanism can implement a control loop to actively drive the first transducer 606 or the second transducer 608 to rest (e.g., using an inverted signal), as applicable. For example, the counter-drive mechanism can be or otherwise include a proportional-integral-derivative controller.

The saturation threshold can be the value of an ADC of the UAV 600 at which saturation begins. As such, detecting that feedback exceeds a saturation threshold can include determining that the feedback causes saturation of the ADC. The feedback can be based on an ultrasonic response to an ultrasonic signal transmitted from the first transducer 606 or the second transducer 608. For example, the feedback can be or otherwise include a target value causing saturation of the ADC.

Responsive to detecting that the feedback exceeds the saturation threshold, the ring-down time for the first transducer 606 or the second transducer 608 (as applicable) can be reduced. Reducing the ring-down time for a transducer can include using the counter-drive mechanism to act against that transducer. For example, the counter-drive mechanism may implement an open-loop counter-drive or a closed-loop counter-drive. In an open-loop counter-drive, a transducer (e.g., one of the first transducer 606 or the second transducer 608) is driven for N cycles to excite that transducer. Once the N cycles are completed, the drive signal is inverted one hundred eighty degrees out of phase and is used to drive that transducer at the same frequency for M cycles in a direction opposite that of the driving during the N cycles. Driving in that opposite direction reduces the ring-down time of that transducer, similar to the way that pushing a pendulum in a direction opposite to its movement may slow down the pendulum. The value of N may be configurable (e.g., based on software used to operate the UAV), and the value of M may be a lower number than the value of N, such as in order to accommodate the reduction in the ring-down time.

In a closed-loop counter-drive, a transducer (e.g., one of the first transducer 606 or the second transducer 608) is driven for N cycles to excite that transducer. Once the N cycles are completed, and as that transducer is ringing, the voltage and waveform across that transducer are observed and then fed back to that transducer as input to drive that transducer using an inverted drive signal (e.g., inverted one hundred eighty degrees out of phase from the direction of driving during the N cycles). The effect may be similar a crystal oscillator where the goal is to decrease the resonance of the crystal. The value of N may be configurable (e.g., based on software used to operate the UAV). The use of a counter-drive mechanism may result in a much quicker reduction in ringing, such as compared to the typical gradual decay in systems not including counter-drive functionality. The quicker reduction in ringing may, for example, result in a better refresh rate for the transducer based on which saturation is detected. As described above, however, the quicker reduction in ringing may also provider other benefits, for example, a reduction in the minimum distance for detecting objects or an improvement in the accuracy of distance measurements for objects close to the UAV 600.

The counter-drive mechanism may also have further advantages. For example, the counter-drive mechanism may also include functionality for managing the driving of the first transducer 606 and/or the second transducer 608. For example, a transducer is very resonant and may have a resonant frequency that differs slightly from stated standards therefor (e.g., due to differences in the manufacturing process of transducers). The feedback control of the counter-drive mechanism can be used to drive the first transducer 606 and/or the second transducer 608 at a frequency at which each attains a highest respective energy output level.

In some implementations, the UAV 600 can include a vibration-resistant coupling element that couples one of the first transducer 606 or the second transducer 608 to an electronic component. For example, and as will be described below with respect to FIG. 7, the vibration-resistance coupling element may be or otherwise include a flexible wire element or like element that prevents vibrations at an electronic component that powers the applicable transducer from being communicated to that transducer. In some implementations, the electronic component to which the vibration-resistant coupling element couples the first transducer 606 or the second transducer 608 may be one of the drive circuitry 604 or the receive circuitry 610.

In some implementations, the UAV 600 can include an energy-absorbing body component that prevents or otherwise reduces a likelihood of a use of a secondary reflection target value to generate a confidence value. For example, the energy-absorbing body component can be a sound-absorbing material that reduces the strength of secondary reflections. The energy-absorbing body component may, for example, be used in tandem with operations for detecting secondary reflection target values (e.g., described with respect to FIG. 5) to prevent inaccurate measurements from being used to generate confidence values. For example, an identified secondary reflection target value may not be considered a target value with respect to the determinations made by the target detection mechanism 620.

In some implementations, the first transducer 606 operates at a first frequency and the second transducer 608 operates at a second frequency. For example, the first transducer 606 and the second transducer 608 can operate on different frequencies, such that they are tuned to a particular channel in order to prevent or at least mitigate a risk of signal interference. The first transducer 606 and the second transducer 608 can alternate transmissions of ultrasonic signals. For example, the first transducer 606 can transmit an ultrasonic signal while the second transducer 608 receives an ultrasonic response, or the second transducer 608 can transmit an ultrasonic signal while the first transducer 606 receives an ultrasonic response. This may effectively double the refresh rate for the UAV 600.

Figure 7:
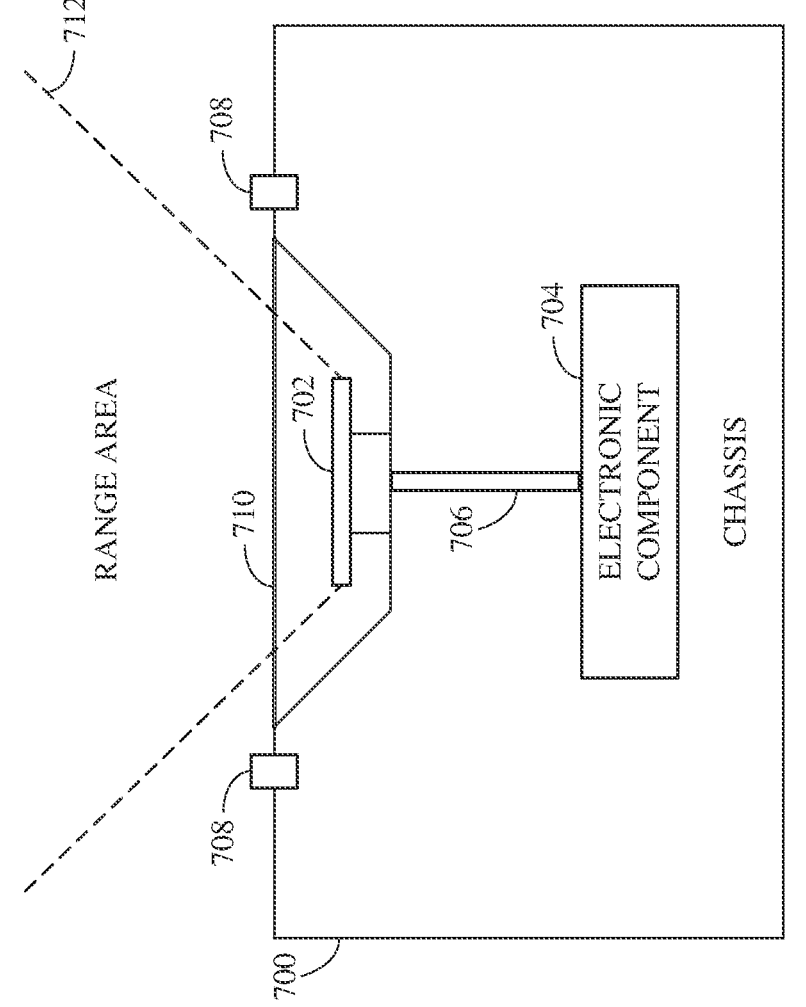
FIG. 7 shows an example of a chassis of a UAV.

FIG. 7 shows an example of a chassis 700 of a UAV. The chassis 700 includes a transducer 702, an electronic component 704, a non-transmissive element 706, one or more mechanical decoupling elements 708, and a covering element 710. The transducer 702 may, for example, be one of the first transducer 606 or the second transducer 608 shown in FIG. 6. The electronic component 704 may be a PCB or like element. The electronic component 704 may, for example, be or be included within drive circuitry or receive circuitry, such as the drive circuitry 604 or the receive circuitry 610 shown in FIG. 6. As such, the electronic component 704 may be coupled to multiple transducers.

The transducer 702 may be very resonant, and so vibrations or like interferences exposed to the transducer 702, such as from the electronic component 704, may cause the transducer 702 to inaccurately transmit ultrasonic signals or receive ultrasonic responses. As such, the transducer 702 and the electronic component 704 are not coupled directly to one another. Instead, the transducer 702 and the electronic component 704 are mechanically coupled to the non-transmissive element 706 independently of one another. The non-transmissive element 706 prevents a transmission of vibration between the transducer 702 and the electronic component 704. The non-transmissive element 706 may, for example, be a flexible wire configured to not transmit vibrations at the electronic component 704 from being communicated to the transducer 702. The non-transmissive element 706 may be referred to as a harness that is decoupled from the transducer 702 in the sense that it does not comprise hard metal components that carry vibrations. The non-transmissive element 706 may be further configured to prevent other interferences from being transmitted between the transducer 702 and the electronic component 704.

The mechanical decoupling elements 708 may include material for preventing interference to the transducer 702 from components external to the chassis 700. For example, the material of the mechanical decoupling elements 708 may operate as a low-pass filter for energy below the operating frequency of a UAV that includes the chassis 700.

The covering element 710 includes a film that covers a cone or other structure of the transducer 702. The covering element 710 may be weatherproof such that it protects the transducer 702 from exposure by natural elements. For example, the covering element 710 may prevent water, dust, salt, or the like to pass through the chassis 700 to the transducer 702, or it may at least reduce the exposure of such water, dust, salt, or like element to the transducer 702. The covering element 710 may be flush with an outer surface of the chassis 700 (e.g., the surface on which the mechanical decoupling elements 708 are located) to prevent the transducer 702 from sticking out beyond that outer surface of the chassis 700. For example, this may enhance the directivity of the ultrasonic waves transmitted and received using the transducer 702, such as by expanding the range area 712 associated with the transducer 702 (e.g., by maximizing or otherwise increasing a beam pattern of the transducer 702).

The chassis 700 may be used to improve the mechanical isolation between transducers of a UAV. For example, first and second transducers (e.g., the first transducer 606 and the second transducer 608) may each use their own chassis 700 to prevent interference to the other, such as based on the ultrasonic signals transmitted and ultrasonic responses received using those first and second transducers.

Implementations of the chassis 700 may include additional, fewer, or different components than shown in FIG. 7. In some implementations, the transducer 702 may include a cone or other rigid structure. In some implementations, the transducer 702 may not include a cone or other rigid structure. For example, the shape of the structure of the chassis 700 surrounding the transducer 702 may be used instead of a cone to cause ultrasonic waves transmitted or received using the transducer 702 to so be transmitted or received within a range area associated with a beam pattern. The beam pattern for the transducer 702 may thus be provided by the chassis 700, rather than a traditional cone element. In this way, the directivity of the beam pattern used by and the distribution of energy of ultrasonic waves for the transducer 702 may be configurable, such as based on a shape of the chassis 700.

Where certain elements of these implementations may be partially or fully implemented using known components, only those portions of such known components that are necessary for an understanding of this disclosure have been described. Detailed descriptions of other portions of such known components have been omitted so as not to obscure the disclosure.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/ 3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/ FDMA, OFDM, PCS/DCS, LTE/LTE-A/TD-LTE, analog cellular, CDPD, satellite systems, millimeter wave or micro- wave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromag- netic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. A method, comprising:
  receiving a first set of ultrasonic responses to first ultra- sonic signals transmitted related to a position of an unmanned aerial vehicle with respect to an object using one or more transducers;
  generating a confidence value of the position of the unmanned aerial vehicle with respect to the object based on a detection of a target value using the first set of ultrasonic responses;
  receiving a second set of ultrasonic responses to second ultrasonic signals transmitted related to a second posi- tion of the unmanned aerial vehicle with respect to the object using the one or more transducers;
  updating the confidence value using the second set of ultrasonic responses based upon the second position of the unmanned aerial vehicle with respect to the object; and
  increasing the confidence value by changing the position of the unmanned aerial vehicle relative to the object.

2. The method of claim 1, wherein the one or more transducers includes a first transducer and a second trans- ducer, wherein the first set of ultrasonic responses includes a first ultrasonic response received from the first transducer and a first ultrasonic response received from the second transducer, and wherein the second set of ultrasonic responses includes only a second ultrasonic response received from the second transducer.

3. The method of claim 1, further comprising:
  using a modeling filter to identify and remove outliers in target value data included in the second set of ultrasonic responses;

responsive to removing the outliers in the target value data, determining average target value data by combin- ing the target value data with other target value data included in the first set of ultrasonic responses; and
  generating a prediction for a next target value based on the average target value data, wherein the confidence value is updated based on a comparison between the predic- tion and the next target value.

4. The method of claim 1, further comprising:
  reducing a ring-down time for the one or more transducers based on a comparison of ultrasonic signal feedback to a saturation threshold.

5. The method of claim 1, wherein the confidence value indicates a likelihood that a position of an unmanned aerial vehicle is in an area relative to an object.

6. The method of claim 1, further comprising:
  updating the confidence value according to a weight associated with a prediction that is generated for a next target value.

7. The method of claim 3, wherein the confidence value is updated with the second set of ultrasonic responses to generate a second confidence value.

8. The method of claim 7, wherein a third confidence value is created based on the comparison between the prediction and the next target value.

9. An unmanned aerial vehicle comprising:
  a first transducer configured to receive a first set of ultrasonic responses to first ultrasonic signals transmit- ted related to a position of the unmanned aerial vehicle with respect to an object using the first transducer;
  a second transducer configured to receive a second set of ultrasonic responses to second ultrasonic signals trans- mitted related to a second position of the unmanned aerial vehicle with respect to the object using the second transducer; and
  a processor that performs operations comprising:
    generate a confidence value of the position of the unmanned aerial vehicle with respect to the object based on a detection of a target value using the first set of the ultrasonic responses;
    update the confidence value using the second set of ultrasonic responses based upon the second position of the unmanned aerial vehicle with respect to the object; and
    increase the confidence value by changing the position of the unmanned aerial vehicle relative to the object.

10. The unmanned aerial vehicle of claim 9, wherein the first transducer has a first beam pattern that detects a first range area and the second transducer has a second beam pattern that detects a second range area.

11. The unmanned aerial vehicle of claim 9, wherein the processor further performs the operations comprising:
  use a modeling filter to identify and remove outliers in target value data included in the second set of ultrasonic responses;
  responsive to removing the outliers in the target value data, determining average target value data by combin- ing the target value data with other target value data included in the first set of ultrasonic responses; and
  generating a prediction for a next target value based on the average target value data, wherein the confidence value is updated based on a comparison between the predic- tion and the next target value.

12. The unmanned aerial vehicle of claim 10, wherein the first range area and the second range area are overlapping.

13. The unmanned aerial vehicle of claim 10, wherein the second range area is larger than the first range area.

14. The unmanned aerial vehicle of claim 11, wherein the confidence value is updated with the second set of ultrasonic responses to generate a second confidence value, and a third confidence value is created based on the comparison of between the prediction and the next target value.

15. A non-transitory computer-readable storage medium storing processor-executable instructions that, when executed by one or more processors, cause the one or more processors to perform operations comprising:

receive a first set of ultrasonic responses to first ultrasonic signals transmitted related to a position of an unmanned aerial vehicle with respect to an object using one or more transducers;

generate a confidence value of the position of the unmanned aerial vehicle with respect to the object based on a detection of a target value using the first set of ultrasonic responses;

receive a second set of ultrasonic responses to second ultrasonic signals transmitted related to a second position of the unmanned aerial vehicle with respect to the object using the one or more transducers;

update the confidence value using the second set of ultrasonic responses based upon the second position of the unmanned aerial vehicle with respect to the object; and increase the confidence value by changing the position of the unmanned aerial vehicle relative to the object.

16. The non-transitory computer-readable storage medium of claim 15, wherein the one or more transducers includes a first transducer and a second transducer, wherein the first set of ultrasonic responses includes a first ultrasonic response received from the first transducer and a first ultrasonic response received from the second transducer, and wherein the second set of ultrasonic responses includes only a second ultrasonic response received from the second transducer.

17. The non-transitory computer-readable storage medium of claim 15, further comprising:

use a modeling filter to identify and remove outliers in target value data included in the second set of ultrasonic responses;

responsive to removing the outliers in the target value data, determining average target value data by combining the target value data with other target value data included in the first set of ultrasonic responses; and generate a prediction for a next target value based on the average target value data, wherein the confidence value is updated based on a comparison between the prediction and the next target value.

18. The non-transitory computer-readable storage medium of claim 15, wherein if the confidence value indicated a high confidence the confidence value indicates detection with the first set of ultrasonic responses and the second set of ultrasonic responses.

19. The non-transitory computer-readable storage medium of claim 18, wherein the first set of ultrasonic responses are transmitted with a first transducer of the one or more transducers and the second set of ultrasonic responses are transmitted with a second transducer of the one or more transducers.

20. The non-transitory computer-readable storage medium of claim 19, wherein the first transducer has a first beam pattern that detects a first range area and the second transducer has a second beam pattern that detects a second range area.

* * * * *